(12) United States Patent
Suzuki et al.

(10) Patent No.: US 7,844,390 B2
(45) Date of Patent: Nov. 30, 2010

(54) METHOD OF OPERATING AN ENGINE UPON OCCURRENCE OF ABNORMAL COMBUSTION AND OPERATION CONTROL APPARATUS THEREFOR

(75) Inventors: Hajime Suzuki, Kanagawa (JP); Yasuhiro Saeki, Kanagawa (JP); Ichirou Ishida, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 138 days.

(21) Appl. No.: 12/223,791

(22) PCT Filed: Sep. 26, 2007

(86) PCT No.: PCT/JP2007/069325

§ 371 (c)(1),
(2), (4) Date: Oct. 2, 2008

(87) PCT Pub. No.: WO2008/038827

PCT Pub. Date: Apr. 3, 2008

(65) Prior Publication Data

US 2009/0037084 A1    Feb. 5, 2009

(30) Foreign Application Priority Data

Sep. 29, 2006    (JP) .............................. 2006-267361

(51) Int. Cl.
*F02D 45/00* (2006.01)
*F02D 41/22* (2006.01)

(52) U.S. Cl. .................................................. 701/112

(58) Field of Classification Search ................ 701/112, 701/102, 101
See application file for complete search history.

(56) References Cited

U.S. PATENT DOCUMENTS

| 4,499,876 A | | 2/1985 | Yamamoto |
| 5,021,960 A | * | 6/1991 | Manaka et al. ................. 701/99 |
| 2005/0016496 A1 | | 1/2005 | Hitomi et al. |

FOREIGN PATENT DOCUMENTS

| JP | 2-30955 A | * | 2/1990 |
| JP | 2-11731 | | 3/1990 |

(Continued)

OTHER PUBLICATIONS

International Search Report mailed Oct. 30, 2007 for International Application No. PCT/JP2007/069325.

*Primary Examiner*—Hieu T Vo
(74) *Attorney, Agent, or Firm*—Wenderoth, Lind, & Ponack, L.L.P.

(57) ABSTRACT

A method and apparatus for operating an engine with a plurality of cylinders, which are capable of appropriately controlling the engine after the cutoff of fuel into a cylinder having heavy knock, without at once stopping the engine upon the detection of the heavy knock. The method of operating the engine, which is capable of stepwise or continuously correcting a burning state through fuel regulation including the cutoff of fuel, upon occurrence of abnormal combustion, executes a stop or output limit operation on the engine. The method includes setting a simulated abnormal combustion, and determining abnormal combustion of a cylinder by comparing a detection signal as to a burning state of a cylinder, which is sequentially selected, with the simulated abnormal combustion signal to determine abnormal combustion in order to execute a cutoff of fuel into the selected cylinder.

4 Claims, 4 Drawing Sheets

FOREIGN PATENT DOCUMENTS

| JP | 11-93757 | 4/1999 |
| JP | 11-287140 | 10/1999 |
| JP | 2005-069042 | 3/2005 |
| JP | 2005-105974 | 4/2005 |
| JP | 2008-45429 A * | 2/2008 |
| JP | 2008-223614 A * | 9/2008 |

* cited by examiner

METHOD OF OPERATING AN ENGINE UPON OCCURRENCE OF ABNORMAL COMBUSTION AND OPERATION CONTROL APPARATUS THEREFOR

BACKGROUND OF THE INVENTION

1. Field of the Invention

The present invention relates to a method of operating an engine upon occurrence of abnormal combustion, applied for a multiple cylinder gas engine, a multiple cylinder diesel engine or the like for power generation, which is capable of stepwise or continuously correcting a burning state through fuel regulation including fuel cutoff, in order to execute stopping or output limit operation of the engine, and also relates to an apparatus for controlling operation of an engine upon occurrence of abnormal combustion.

2. Description of the Related Art

A multiple cylinder gas engine or a multiple cylinder Diesel engine for power generation incorporates a protecting circuit for stopping the engine when abnormal combustion, that is, the so-called heavy knock, occurs in one or more of cylinders.

Specifically, in a conventional multiple cylinder gas engine (or a multiple cylinder Diesel engine) for power generation, when a cylinder pressure abruptly increases in one of cylinders, that is, the so-called heavy knock occurs, in a normal operating condition of the engine, the supply of fuel into all cylinders is cut off so as to stop the operation of the engine after a predetermined time elapses from the time of the detection of the heavy knock.

It is noted that a patent document 1 (Japanese Patent Laid-open No. 2005-69042) discloses measures for controlling operation of a gas engine upon occurrence of abnormal combustion, comprising a cylinder pressure detector for detecting a pressure in each of cylinders of the gas engine, and a combustion diagnosis unit for determining occurrence of abnormal combustion such as knocking, misfiring or the like in the engine cylinder in accordance with a detected value of cylinder pressure transmitted from the cylinder pressure detector, wherein when the combustion diagnosis unit determines occurrence of abnormal combustion, the injection timing of gas into the cylinder and the torch ignition timing are adjusted.

Further, a patent document 2 (Japanese Patent publication No. H2-11731) discloses measures for controlling operation of an engine upon occurrence of abnormal combustion, which is adapted to stop fuel injection from a fuel injector which causes an abnormality, and simultaneously stop fuel injection from a fuel injector associated with at least one cylinder which has a specific relationship with respect to a sequence order of a cylinder associated with the abnormal fuel injection, thereby it is possible to prevent the engine from stopping upon occurrence of abnormal combustion.

In a conventional multiple cylinder gas engine (or multiple cylinder Diesel engine) for power generation, as stated above, when heavy knock occurs in one of cylinders in a normal operating condition, the supply of fuel into all cylinders is cut off so as to stop the engine after predetermined time elapses from the time of detection of the heavy knock. That is, in the above-mentioned conventional technology, the engine merely comes to a stop after the detection of occurrence of heavy knock in order to protect the engine.

Further, the patent document 1 discloses no more than the measure for adjusting the injection timing of gas into a result of cylinder and the torch ignition timing in accordance with a determination of occurrence of abnormal combustion such as knocking, misfiring or the like in the engine by the combustion diagnosis unit. That is, no consideration is made for the control of operation of fuel cutoff of an engine in view of occurrence of heavy knock in one of cylinders of the engine.

The patent document 2 fails to disclose any measures other than measures for stopping fuel injection of a fuel injector which causes an abnormality and for simultaneously stopping fuel injection of a fuel injector for a cylinder having a specific relationship with the sequence order of a cylinder associated with the abnormal fuel injector. That is, no consideration is made for detailed control for operation of fuel cutoff of an engine upon occurrence of abnormal combustion.

SUMMARY OF THE INVENTION

The present invention is devised in view of the problems inherent to the prior art, and accordingly, an object of the present invention is to provide a method of operating an engine upon occurrence of abnormal combustion and an apparatus for controlling operation of an engine upon occurrence of abnormal combustion, capable of appropriately performing operation control of an engine after cutoff of fuel into a cylinder which causes heavy knock without stopping at once the engine upon detection of occurrence of heavy knock.

To the end, according to the present invention, there is provided a method of operating a multiple cylinder engine which has a plurality of cylinders and which is capable of stepwise or continuously correcting a burning state through fuel regulation including fuel cutoff, upon occurrence of abnormal combustion in order to execute a stop or an output limit operation of the engine, characterized in that a detection signal exhibiting a burning state of a selected cylinder which is sequentially selected among a plurality of cylinders is compared with a simulated abnormal combustion signal which has been beforehand set up by calculating an abnormal burning state of the engine in simulation, so as to determine the presence of occurrence of abnormal combustion in the selected cylinder in order to perform cutoff of fuel into the selected cylinder when abnormal combustion occurs.

Preferably, according to the above-mentioned invention, a burning state of the selected cylinder which has been subjected to the cutoff of fuel is detected after a predetermined time elapses from the time of cutoff of fuel into the selected cylinder, and if the combustion still continues in the cylinder, the engine is stopped, but if the combustion in the cylinder ceases, the cutoff of fuel into the cylinder is held while the engine is continuously operated with a predetermined limited output power.

Further, according to the invention relating to an apparatus for carrying out the above-mentioned operating method, there is provided an apparatus for controlling a multiple cylinder engine upon occurrence of abnormal combustion, the engine comprising a plurality of cylinders and being arranged to stepwise or continuously correct a burning state through fuel regulation including cutoff of fuel, the apparatus comprising a means for stopping the engine or carrying out an output limit operation of the engine, characterized by:

a burning state detection means for detecting a burning state of a selected cylinder which is selected sequentially among the plurality of cylinders, a means for setting a simulated abnormal combustion signal which is obtained by calculating an abnormal burning state of the engine in simulation, an abnormal combustion determining means for comparing a detection signal as to a burning state of the selected cylinder, which is delivered from the burning state detection means, with the simulated abnormal combustion signal set in the simulated abnormal combustion signal setting means so as to determine the presence of occurrence of abnormal combustion in the selected cylinder, and a fuel cutoff instruction means for instructing a cutoff of fuel into the selected cylinder for which the abnormal combustion is determined.

Preferably, according to the apparatus invention, there is provided a timer for causing detection of a burning state of the selected cylinder after a predetermined time elapses from the time of cutoff of fuel into the selected cylinder by the fuel cutoff instruction means, and the abnormal combustion control apparatus includes a means for determining a stop of operation of the engine, which stops the engine if the combustion continues in the cylinder on the basis of a result of detection of the burning state, but holds the cutoff of fuel into the cylinder while continuously operating the engine with a predetermined limited output power if the combustion of the cylinder ceases.

In view of the above-mentioned invention, a relationship between an abnormal burning state of the engine, or a state of occurrence of the above-mentioned heavy knock, and an engine operating condition including factors in a fuel injection system, such as a fuel injection timing, a fuel injection quantity and a fuel injection mode has been previously obtained through simulation calculation or results of experiments, and set in the simulated abnormal combustion signal setting means in the abnormal combustion control unit as a simulated abnormal combustion signal, a burning state in a selected cylinder sequentially selected among a plurality of cylinders is detected by the burning state detecting means, then a burning condition detection signal as to the selected cylinder, delivered from the burning state detecting means, is compared with the simulated abnormal combustion signal set in the simulated abnormal combustion signal setting means so as to determine the presence of occurrence of abnormal combustion in the selected cylinder, and an occurrence of abnormal combustion, that is, heavy knock in the selected cylinder is determined if the burning state of the selected cylinder coincides with or approximates to the state of the simulated abnormal combustion signal. Thus, the injection of fuel into the selected cylinder is cut off through the intermediary of the fuel cutoff instruction means, thereby it is possible to avoid at once stopping the engine upon occurrence of heavy knock in one of the cylinders.

Further, after determination of the occurrence of the above-mentioned heavy knock, a burning state of the cylinder for which the cutoff of fuel is made, is detected after a predetermined time counted by the timer elapses, and the engine is stopped by the abnormal combustion control unit if the combustion continues in the cylinder but the cutoff of fuel into the cylinder is held while the engine is continuously operated with a predetermined limited output power if the combustion of the selected cylinder ceases. Thus, by surely checking whether the combustion of the cylinder in which heavy knock occurs ceases or not, if the combustion of the cylinder ceases, the operation of the engine is continued with a limited output power by the other cylinders, and accordingly, a stable operation of the engine can be held even after occurrence of heavy knock, but if the combustion of the cylinder continues, the engine is stopped, thereby it is possible to prevent occurrence of inferior combustion after occurrence of heavy knock.

According to the present invention, the relationship between the engine operating condition including parameters in the fuel injection system, such as a fuel injection timing, a fuel injection quantity and a fuel injection mode, and a condition of occurrence of heavy knock is quantitatively set in detail as the simulated abnormal combustion signal, and the occurrence of heavy knock in the selected cylinder is determined if the burning state in the selected cylinder coincides with or approximates to the simulated abnormal combustion signal. Thus, the injection of fuel into the selected cylinder is cut off, thereby it is possible to avoid at once stopping the engine.

Further, after the determination of occurrence of heavy knock, a burning state of the cylinder for which the cutoff of fuel is made, is detected after a predetermined time elapses, and the engine is stopped if the combustion of the cylinder continues but the cutoff of fuel into the cylinder is held while the operation of the engine is continued with a predetermine limited output power if the combustion of the cylinder ceases. Thus, whether the combustion of the cylinder in which the heavy knock occurs ceases or not is surely checked, and the engine is continuously operated with a limited output power by the other cylinders if the combustion of the cylinder ceases, thereby it is possible to maintain the stable operation of the engine after occurrence of heavy knock, but the engine is stopped if the combustion of the cylinder continues, thereby it is possible to prevent occurrence of inferior combustion after the occurrence of the heavy knock.

DESCRIPTION OF THE PREFERRED EMBODIMENTS

Figure 1:
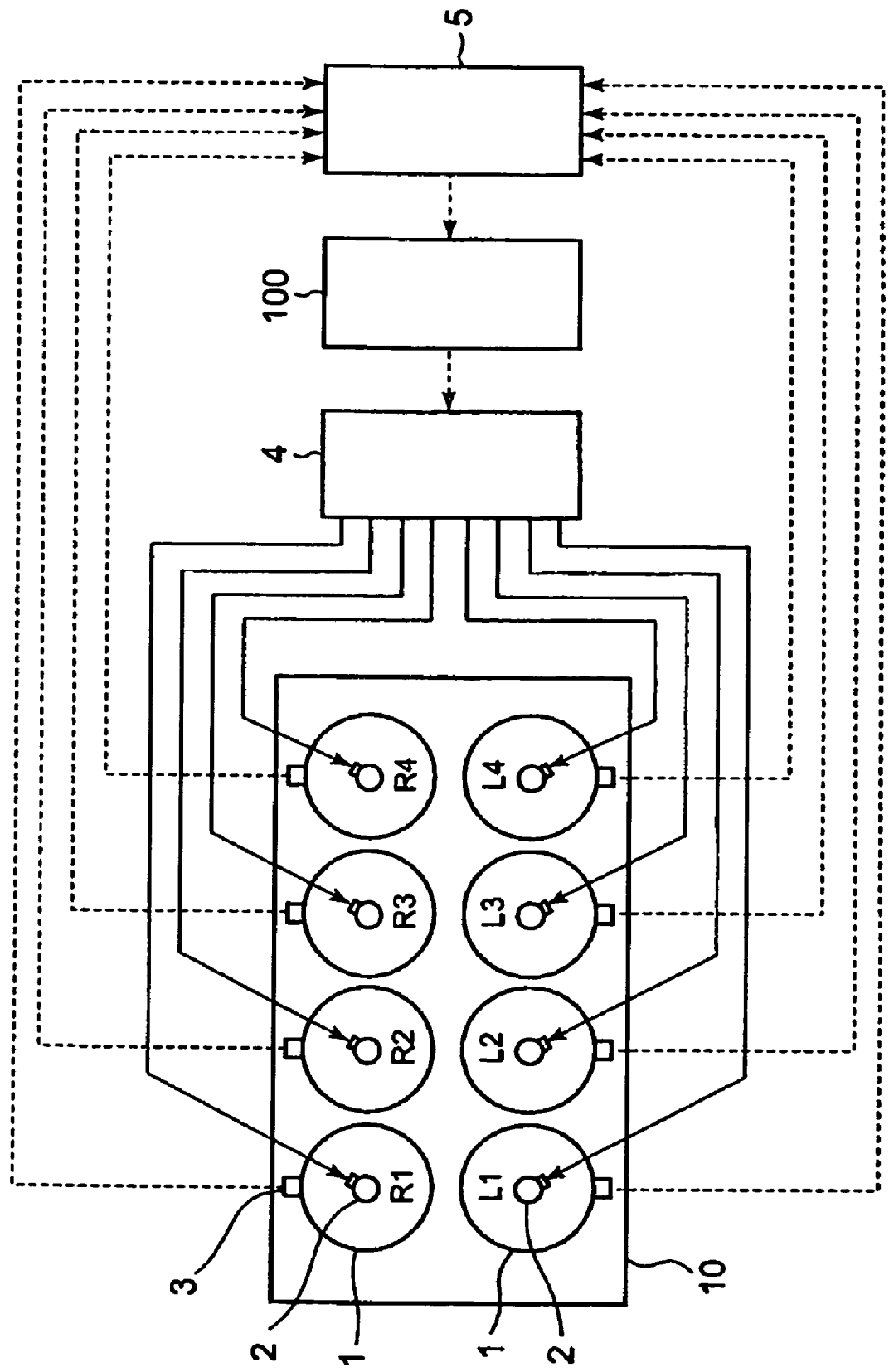
FIG. 1 is a plan view illustrating an overall configuration of a system for operating a multiple cylinder gas engine for power generation upon occurrence of abnormal combustion in the multiple cylinder gas engine for power generation, in an embodiment of the present invention.

Detailed explanation will be hereinbelow made of the present invention in the form of an embodiment shown in the drawings. It is noted here that dimensions, materials, shapes and relative arrangements of components stated in this embodiment are mere examples for explanation, and are not intended to limit the technical scope of the present invention unless otherwise specified.

FIG. 1 is a plan view illustrating an overall configuration of a system for operating a multiple cylinder gas engine for power generation upon occurrence of abnormal combustion in the multiple cylinder gas engine in an embodiment of the present invention.

In FIG. 1, there are shown an engine 10 which is, in this example, a V-shape multiple (eight) cylinder gas engine but which may be a multiple cylinder Diesel engine or a multiple cylinder gasoline engine, cylinders (eight cylinders) 1 of the engine 10, fuel injectors 2 for injecting fuel gas into the respective cylinders 1, a fuel control unit 4 for controlling a fuel quantity and a fuel injection timing of each of the fuel injectors 2.

The above-mentioned configuration is similar to that of a well-known V-shape multiple (eight) cylinder engine.

The present invention concerns a method of operating an engine upon occurrence of abnormal combustion or heavy knock (which will be hereinbelow generally referred to as "heavy knock") and an operation control apparatus.

Further, in FIG. 1, there are shown cylinder pressure sensors 3 for detecting cylinder pressures (pressures in the respective cylinders) of the engine, which are fitted in the respective cylinders 1 so as to detect variations in pressures in the cylinders, a combustion diagnosis unit 5 receiving a detected value of variation in cylinder pressure of each of the cylinder, delivered from the associated one of the cylinder pressure sensors 3, and an operating condition of the engine including a speed of the engine 10 and an engine load, for diagnosing a burning state of the engine 10 in accordance with these input signals.

Further, there is shown a heavy knock control unit 100 receiving detected values of a burning state, an operating condition of the engine 10 and a result of the diagnosis from the combustion diagnosis unit 5, for carrying out computation and control which will be described later, from the detected values of the burning state, the operating condition and the result of diagnosis so as to deliver a control signal to the fuel control unit 4 which is therefore controlled.

Figure 2:
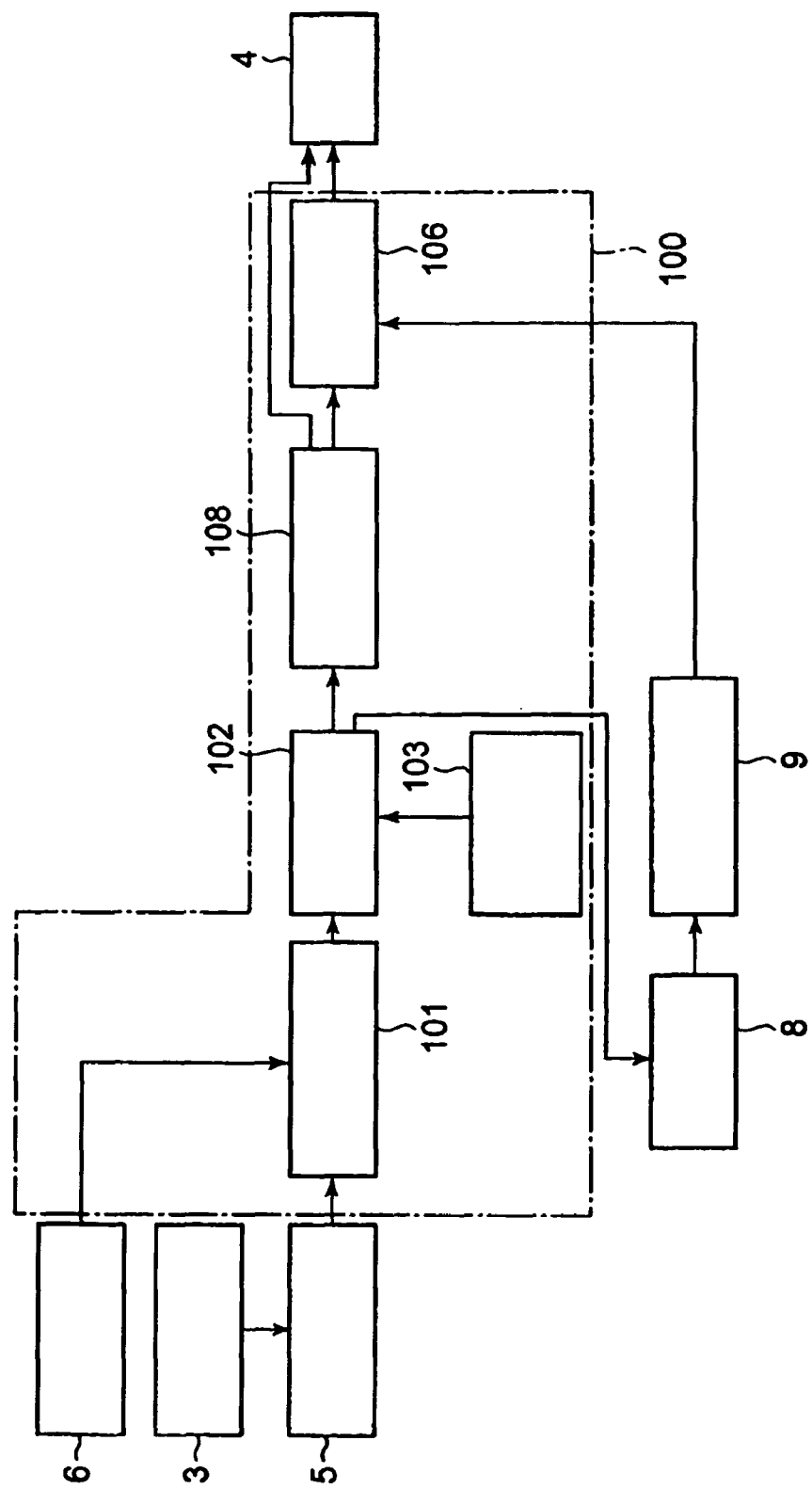
FIG. 2 is a control block diagram for heavy knock in the embodiment shown in FIG. 1.

Next, referring to FIG. 2, explanation will be hereinbelow made of a method of operating an engine upon occurrence of heavy knock and an operation control apparatus in the embodiment of the present invention.

The combustion diagnosis unit 5 receives a detected value of variation in a cylinder pressure from each of the cylinder pressure sensors 3, and an engine operating condition including a speed of the engine 10 and an engine load, and diagnoses a burning condition of the engine 10 in view of these input signals.

A detection signal as to a burning state of each cylinder 1 on the basis of a result of diagnosis by the combustion diagnosis unit 5 is delivered to a means 101 for detecting a burning state of a selected cylinder within the heave knock control unit 100.

A cylinder selection means 6 sequentially selects a cylinder (selected cylinder) for which a burning state is detected as will be described later, and delivers a number of the selected cylinder to the selected cylinder burning state detecting means 101 (refer to step (1) in FIG. 3).

Figure 3:
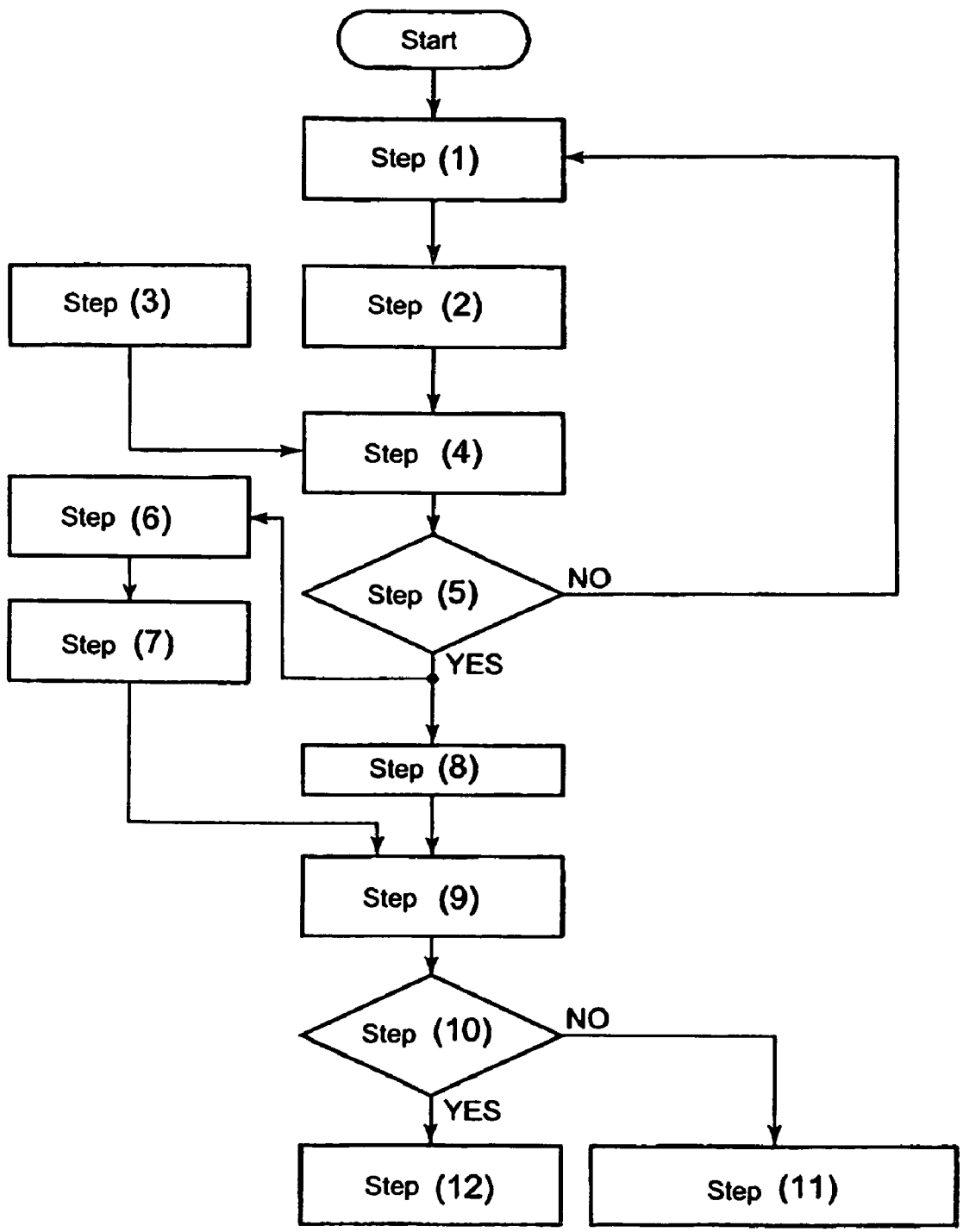
FIG. 3 is a control flow-chart for heavy knock in the embodiment shown in FIG. 1.

The selected cylinder burning state detecting means 101 detects, in view of a signal exhibiting a result of combustion diagnosis by the combustion diagnosis unit 5, a burning state of the selected cylinder or a situation of variation in cylinder pressure, which is then delivered into a means 102 for determining occurrence of heavy knock (step (2) in FIG. 3).

A means 103 for setting a simulated heavy knock signal, is adapted to obtain a relationship between a condition of occurrence of heaving knock or a burning state such as a situation of variation in cylinder pressure upon occurrence of heavy knock, and an engine operating condition including parameters of a fuel injection system, such as fuel injection timing, a fuel injection quantity and a fuel injection mode, through simulation calculation or results of experiments, and sets the relationship as a simulated heavy knock signal which is then delivered to the heavy knock occurrence determining means 102 (step (3) in FIG. 3).

The heavy knock occurrence detecting means 102 compares the burning state detection signal such as a situation of variation in cylinder pressure in the selected cylinder, delivered from the selected cylinder burning state detecting means 101, with the simulated heavy knock signal set in the simulated heave knock signal setting means 103 so as to determine whether heavy knock occurs in the selected cylinder or not (step (4) in FIG. 3).

Further, if the burning state of the selected cylinder coincides with or approximate to a state of the simulated heavy knock signal, it is determined that heavy knock occurs in the selected cylinder, and the result of determination is delivered to a fuel cutoff instruction means 108 and a timer unit 8.

Meanwhile, if no heavy knock occurs, the above-mentioned procedure is started for another cylinder (step (5) in FIG. 3).

The fuel cutoff means 108 delivers a fuel cutoff instruction for the selected cylinder to the fuel control unit 4 so as to cut off fuel into the selected cylinder in accordance with a result of determination of occurrence of heavy knock in the selected cylinder, and also delivers the fuel cutoff signal in the selected cylinder to a means 106 for stopping operation of an engine (step (8) in FIG. 3).

Further, in response to a time signal delivered from the timer unit 8 and indicating a time elapsing from the time of determination of occurrence of heavy knock, after a predetermined time elapses (step (6) in FIG. 3) from the time of detection of heavy knock, a burning state in the selected cylinder after the fuel cutoff is detected by a fuel cutoff cylinder burning state detecting means 9, and the thus detected burning state is delivered to the engine operation stopping means 106 (step (7) in FIG. 3).

The engine operation stopping means 106 checks the burning state detection signal in the selected cylinder, detected by the fuel cutoff cylinder burning state detecting means 9 after a predetermined time counted by the timer unit 8 elapses from the time of detection of occurrence of heavy knock in the selected cylinder (steps (9) and (10) in FIG. 3).

As a result of the above-mentioned checking, the cutoff of fuel into the selected cylinder is maintained if the combustion of the selected cylinder ceases under the fuel cutoff instruction signal, and further, the engine 10 is continuously operated with a predetermined limited output power (step (11) in FIG. 3).

Meanwhile, the engine is stopped if the combustion of the selected cylinder continues even though the above-mentioned fuel cutoff signal is applied thereto (step (12) in FIG. 3).

A determination signal in view of the result of the above-mentioned check is delivered to the fuel control unit 4.

Figure 4:
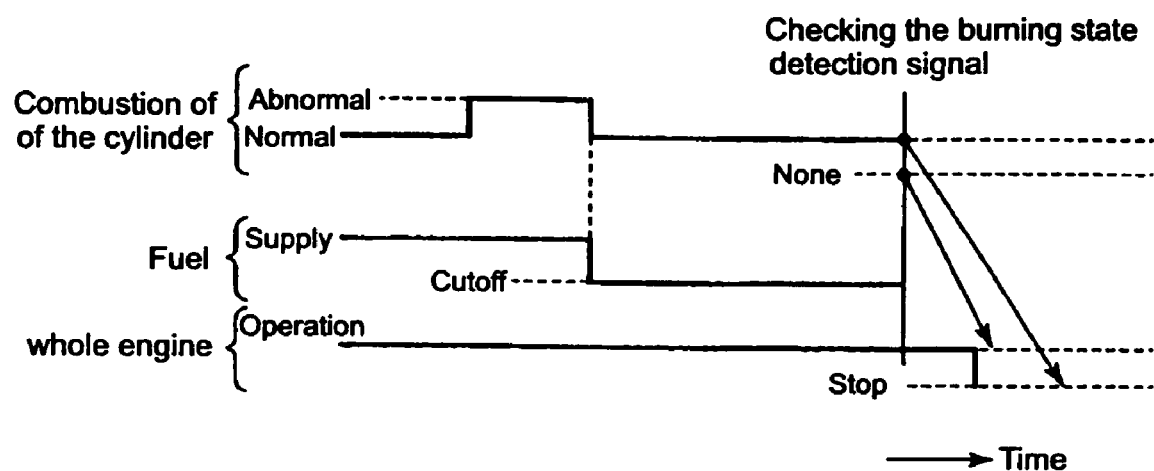
FIG. 4 is a chart illustrating changes in combustion, fuel supply and output power upon occurrence of heavy knock in the multiple cylinder gas engine for power generation in the embodiment shown in FIG. 1.

FIG. 4 shows variations in combustion, feed and discharge of fuel and output power in a cylinder upon occurrence of abnormal combustion or heavy knock in this embodiment, in time series.

In view of the above-mentioned embodiment, the relationship between a condition of abnormal combustion or a condition of occurrence of the heaving knock and an engine operating condition including parameters in a fuel injection system, such as a fuel injection timing, a fuel injection quantity and a fuel injection mode, has been beforehand obtained through simulation calculation or results of experiments, and has been set as a simulated heavy knock signal in the simulated heavy knock signal setting means 103 in the heavy knock unit 100.

Further, a burning state in a selected cylinder which is sequentially selected among a plurality of cylinders is detected by the selected cylinder burning state detecting means 9, and in comparison of a selected cylinder burning condition signal from the selected cylinder burning state detecting means 9 with the simulated heavy knock signal set in the simulated heavy knock signal setting means 103, occurrence of heavy knock in the selected cylinder is determined if the burning state of the selected cylinder coincides with or approximates to the state of the simulated heavy knock signal. Thus, the injection of fuel into the selected cylinder is cut off by means of the fuel cutoff instruction means 108, thereby it is possible to avoid at once stopping the engine.

Further, after the determination of occurrence of the above-mentioned heavy knock, a burning state of the cylinder for which the cutoff of fuel is made, is detected after a predetermined time counted by the timer unit 8 elapses, and the engine is stopped by the heavy knock control unit 100 if the combustion of the cylinder still continues, but the cutoff of fuel into the selected cylinder is maintained while the engine continuously operated with a predetermined limited output power if the combustion of the cylinder ceases. Thus, whether the combustion of the cylinder in which heavy knock occurs is stopped or not is surely checked, and the engine is continuously operated with a limited power by the other cylinders if the combustion of the cylinder ceases, thereby it is possible to maintain the stable operation of the engine after occurrence of heavy knock while the engine is stopped if the combustion of the cylinder still continues, thereby it is possible to prevent occurrence of inferior combustion after occurrence of heavy knock.

According to the present invention, there can be provided a method of operating an engine upon occurrence of abnormal combustion and an apparatus for controlling operation of an engine upon occurrence of abnormal combustion, in which the control of operation of the engine can be appropriately carried out after cutoff of fuel into a cylinder in which heavy knock occurs, without stopping at once the engine after detection of occurrence of heavy knock.

The invention claimed is:

1. An apparatus for controlling operation of a multiple cylinder engine which has a plurality of cylinders and which is arranged to stepwise or continuously correct a burning state through fuel regulation including fuel cutoff, the apparatus comprising a means for executing a stop or an output limit operation of the multiple cylinder engine upon an occurrence of an abnormal condition of the multiple cylinder engine, characterized by an abnormal combustion control unit including a burning state detecting means for detecting a burning state of a selected cylinder which is sequentially selected among the plurality of cylinders, a simulated abnormal combustion signal setting means for setting a simulated abnormal combustion obtained by calculating an abnormal combustion state of the multiple cylinder engine in simulation, an abnormal combustion occurrence determining means for comparing a burning state detection signal as to the selected cylinder, delivered from the burning state detection means with the simulated abnormal combustion signal set in the simulated abnormal signal setting means so as to determine a presence of an occurrence of abnormal combustion in the selected cylinder, and a fuel cutoff instruction means for instructing a cutoff of fuel into the selected cylinder for which the occurrence of the abnormal combustion is determined, wherein the apparatus further comprises a timer for causing detection of a burning state of the selected cylinder after a predetermined time elapses from a time of cutoff of fuel into the selected cylinder by the fuel cutoff instruction means, and characterized in that the abnormal combustion control means includes an engine operation stopping means for stopping the multiple cylinder engine if the combustion of the cylinder continues on the basis of a result of detection of the burning state, but maintaining the cutoff of fuel into the cylinder while continuously operating the multiple cylinder engine with a limited output power if the combustion of the cylinder ceases.

2. A method of operating a multiple cylinder engine which has a plurality of cylinders and which is capable of stepwise or continuously correcting a burning state through fuel regulation including fuel cutoff, upon an occurrence of abnormal combustion so as to execute a stop or an output limited operation of the multiple cylinder engine, characterized in that a simulated abnormal combustion signal obtained by calculating an abnormal combustion state of the multiple cylinder engine in simulation is beforehand set, a detection signal as to a burning state of a selected cylinder which is sequentially selected among the plurality of cylinders is compared with the simulated abnormal combustion signal so as to determine a presence of an occurrence of abnormal combustion in the selected cylinder in order to execute a cutoff of fuel into the selected cylinder, wherein a burning state of the cylinder for which the cutoff of fuel is made is detected after a predetermined time elapses from a time of cutoff of fuel into the selected cylinder, and an operation of the multiple cylinder engine is stopped when combustion in the cylinder continues, but the cutoff of fuel into the cylinder is maintained while the multiple cylinder engine is continuously operated with a predetermined limited output power if the combustion of the cylinder ceases.

3. An apparatus for operating an engine having a plurality of cylinders, the apparatus comprising:
   a fuel control unit operable to control a supply of fuel to the cylinders of the engine;
   a burning state detecting means for detecting a burning state of a selected cylinder of the plurality of cylinders;
   a simulated abnormal combustion signal setting means for setting a simulated abnormal combustion state of the engine in simulation;
   an abnormal combustion occurrence determining means for comparing the burning state of the selected cylinder with the simulated abnormal combustion state and determining whether abnormal combustion is occurring in the selected cylinder;
   a timer for counting an elapse time from a determination that abnormal combustion is occurring in the selected cylinder;
   a fuel cutoff instruction means for issuing a signal to the fuel control unit to cut off fuel to the selected cylinder and issuing a signal to the timer to start counting the elapse time, if the abnormal combustion occurrence determining means determines that abnormal combustion is occurring in the selected cylinder; and
   an engine stopping means for detecting whether combustion of the selected cylinder has stopped after the elapse time counted by the counter has reached a predetermined amount of time from the determining that abnormal combustion is occurring in the selected cylinder, and issuing a signal to the fuel control unit to (1) stop the engine if combustion of the selected cylinder has not stopped or (2) operate the engine with a predetermined limited output power if combustion of the selected cylinder has stopped.

4. A method for operating an engine having a plurality of cylinders, the method comprising:
   selecting one of the cylinders of the engine;
   detecting a burning state of the selected cylinder;
   comparing the burning state of the selected cylinder with a simulated abnormal combustion state of the engine in simulation, and determining whether abnormal combustion is occurring in the selected cylinder; and
   if abnormal combustion is occurring in the selected cylinder:
      cutting off fuel to the selected cylinder;
      after a predetermined amount of time from the determining that abnormal combustion is occurring, detecting whether combustion of the selected cylinder has stopped;
      if combustion of the selected cylinder has not stopped, stopping the engine; and
      if combustion of the selected cylinder has stopped, operating the engine with a predetermined limited output power.

* * * * *